May 22, 1923.  1,455,991

C. E. CHILDS

COMBINED WIND DEFLECTOR, SUNSHADE, AND SIDE INCLOSURE FOR VEHICLES

Filed Jan. 14, 1920  5 Sheets-Sheet 1

INVENTOR.
CLARENCE E. CHILDS
BY A. B. Bowman
ATTORNEYS.

May 22, 1923.

C. E. CHILDS 1,455,991

COMBINED WIND DEFLECTOR, SUNSHADE, AND SIDE INCLOSURE FOR VEHICLES

Filed Jan. 14, 1920

INVENTOR.

CLARENCE E. CHILDS

BY A.B.Bowman

ATTORNEYS.

May 22, 1923.                                                          1,455,991
C. E. CHILDS
COMBINED WIND DEFLECTOR, SUNSHADE, AND SIDE INCLOSURE FOR VEHICLES
Filed Jan. 14, 1920                    5 Sheets-Sheet 3

INVENTOR.
CLARENCE E. CHILDS.
BY A.B. Bowman
ATTORNEYS.

INVENTOR.
CLARENCE E. CHILDS.
BY A.B.Bowman
ATTORNEYS.

May 22, 1923.                                                                1,455,991
C. E. CHILDS
COMBINED WIND DEFLECTOR, SUNSHADE, AND SIDE INCLOSURE FOR VEHICLES
Filed Jan. 14, 1920                    5 Sheets-Sheet 5

INVENTOR.
CLARENCE E. CHILDS.
BY A. B. Bowman
ATTORNEYS.

Patented May 22, 1923.

1,455,991

UNITED STATES PATENT OFFICE.

CLARENCE E. CHILDS, OF PALO ALTO, CALIFORNIA.

COMBINED WIND DEFLECTOR, SUNSHADE, AND SIDE INCLOSURE FOR VEHICLES.

Application filed January 14, 1920. Serial No. 351,382.

*To all whom it may concern:*

Be it known that I, CLARENCE E. CHILDS, a citizen of the United States, residing at Palo Alto, in the county of Santa Clara and State of California, have invented a certain new and useful Combined Wind Deflector, Sunshade, and Side Inclosures for Vehicles, of which the following is a specification.

My invention relates to apparatus for providing wind deflectors for both the front and rear seats of a vehicle, convertible into sun shades and also convertible into enclosing apparatus for enclosing the sides of the vehicle between the top and body and the objects of my invention are: first, to provide an apparatus so constructed and supported for enclosing any portion of the side of a vehicle between the top and the body and convertible for wind deflectors extending at angles and having anti-glare apparatus or a sun shade; second, to provide apparatus of this class which may be positioned up against the top out of the way when not in use; third, to provide such an apparatus which may be moved to varying angles to suit the direction of the wind or the angle of the sun or other light rays; fourth, to provide an apparatus of this class in which the direction of the panels may be changed from a normally horizontal to a normally vertical or from a normally vertical to a normally horizontal position; fifth, to provide an apparatus of this class which is applicable for use with the various types and makes of vehicles now in use; sixth, to provide an apparatus of this class in which the ordinary car may be readily converted into a closed car; seventh, to provide an apparatus of this class in which the full length of the vehicle can be partly closed and partly open to suit the convenience and desires of the occupants of the vehicle; eighth, to provide an apparatus of this class in which all of the parts are convertible, adjustable, compact, light and convenient of operation and ninth, to provide an apparatus of this class which is very simple and economical of construction, durable, easy to install, easy to operate, adjust and convert and which will not readily deteriorate or get out of order.

With these and other objects in view as may appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application in which:

Similar characters of reference refer to similar parts and portions throughout the several views of the drawings.

The panel sections 1 to 8 inclusive, supporting bar 9, clamp hinges 10, support 11, T member 12, angle support 13, bolt 14, slotted support 15, bolt 16, hinges 17, latch members 18, clip 19 and support 20 constitute the principal parts and portions of my apparatus.

The panel members 1 to 8 consist preferably of frames 1ª to 8ª inclusive, composed of light rigid material and mounted on these frames are panels 1 to 8 inclusive on their respective frames.

These panels may be composed of transparent, translucent or opaque materials or any of them may be one of the three and they are secured thereon in any desirable manner but it is preferred to secure them by means of a spring catch support such as a glove fastener so that the panels are interchangeable on the frames of approximately relative size and shape, the means of fastening being no part of my present invention. In the present drawings I have shown small pieces of half round material for supporting the panels.

Figure 1:
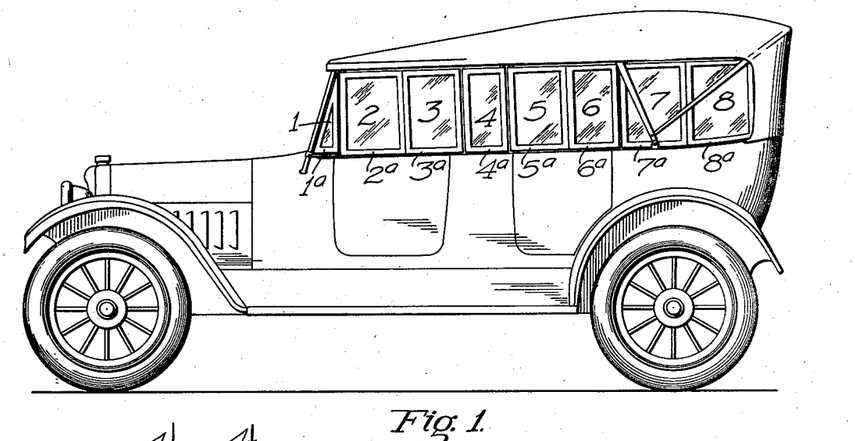
Figure 1 is a side elevational view of a vehicle showing my apparatus in position enclosing the one side of the vehicle.
Figure 2:
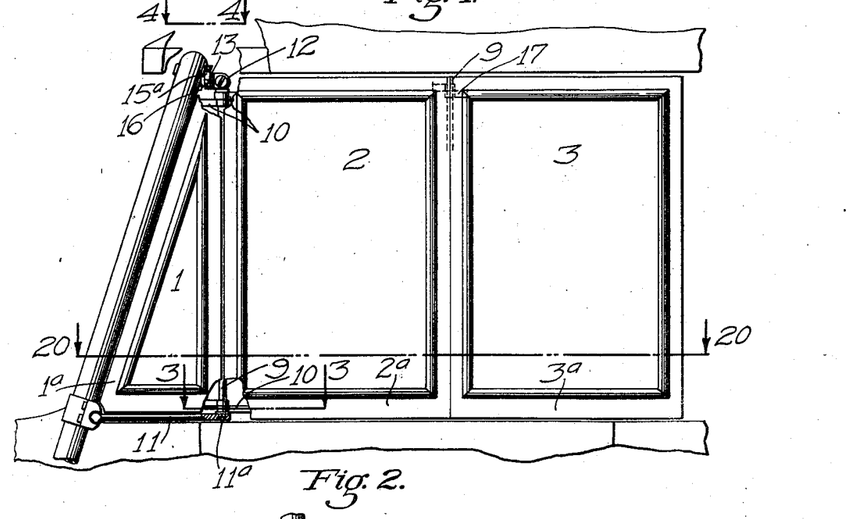
Fig. 2 is a side elevational view on an enlarged scale of the front seat and door extension side members showing the same and contiguous parts fragmentarily and in section to facilitate the illustration.
Figure 9:
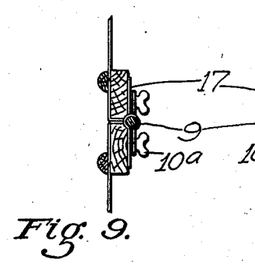
Fig. 9 is an enlarged fragmentary sectional view of the means for frictionally connecting the separate panel sections.
Figure 10:
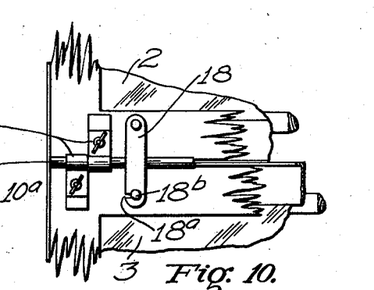
Fig. 10 is a similar view at a right angle thereto.

The panel member 1 is shaped to suit the front portion of the vehicle side, for instance if the wind shield slants backwardly the front portion of this panel member slants backardly, accordingly, while the back portion when positioned is vertical or approximately so. If however the wind shield is vertical the panel member 1 may be dispensed with. It is pivotally mounted on the supporting bar 9 by means of clamp hinges 10 shown best in Fig. 3. These clamp hinges 10 are preferably metallic bands secured to the frames of the panel members at their one ends and extending around the bar 9 and their other ends spaced apart slightly and provided with a wing screw 10ª through the member 10 to provide frictional engagement between the members 9 and 10 thus supporting the panel members in any position desired around the bar 9. All panel members are similarly supported upon a bar 9 as shown best in Fig. 2 of the drawings, although it may be preferable to connect some of the panel members that are supported upon each other like the panel member 3 is hinged to the panel member 2 by means of hinges 17 secured to the frames of said panel members as shown best in Figs. 9 and 10 of the drawings and these panel members 2 and 3 are provided with a latch 18 pivotally connected to the member 2 and provided with a slot 18ª in its free end adapted to engage an extended pin 18ᵇ on the member 3 thus providing for supporting the members 2 and 3 in alignment with each other but permitting their pivotal relative movement to each other as desired when the latch is released.

It will be here noted that there may be any number of these panel members 2 and 3 hinged and latched together in the same manner as desired.

This bar 9 is provided on its upper end with a T-shaped element 12. One of the members of said element is secured to said bar 9 and the other members thereof extend at a right angle thereto and said other members are pivotally mounted on a bolt 14 which is secured on one angle member of the angled member 13, the tension of the bolt 14 being such as to permit the member 12 to revolve on said bolt but provides suitable friction between the members 12 and 13, the other member of the angle 13 is pivotally and shiftably mounted on a support 15 which is secured to the vehicle, preferably the top or to the wind shield as desired. In this case I have shown it secured to the top portion of the wind shield and the member 13 is held in frictional engagement with the support 15 by means of a bolt 16, thus providing a triple pivotally mounted frictionally controlled support for the supporting bar 9.

The lower end of this supporting bar 9 is adapted to rest in a socket 11ª in the support 11 which support is clamped to the wind shield or body of the vehicle in a position so that it extends so as to receive the lower end of the bar 9 when it is lowered by shifting the bolt 16 in the slot 15ª in the support 15.

Figures 5, 6, 7, 8:
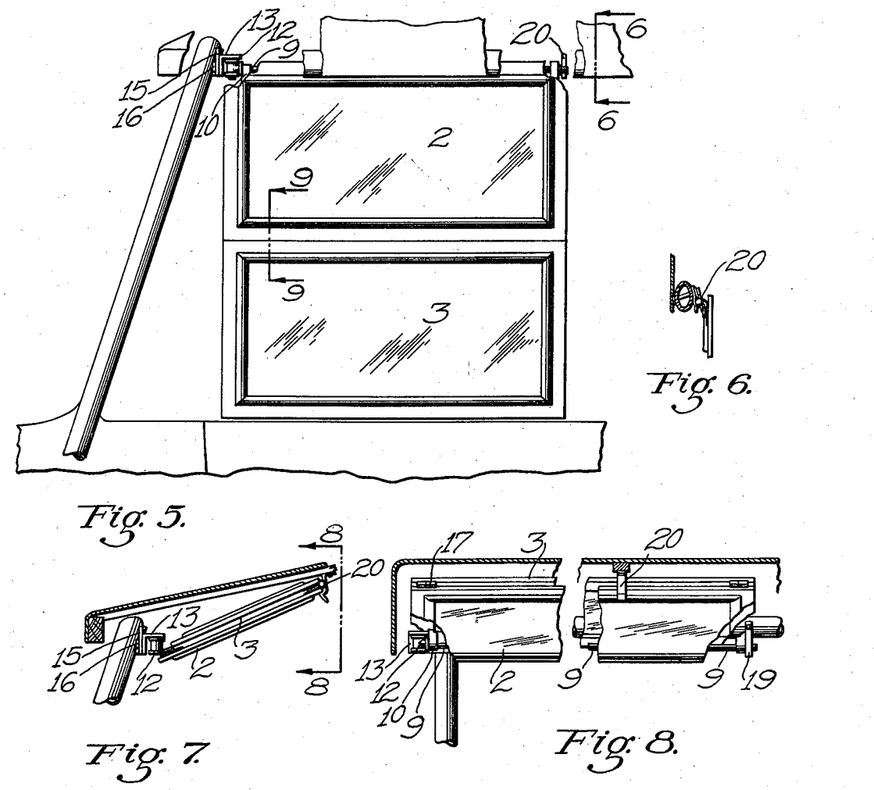
Fig. 5 is a similar view to that of Fig. 2 showing the panel sections converted to a horizontal instead of a vertical position.
Fig. 6 is a sectional view through 6—6 of Fig. 5.
Fig. 7 is a fragmentary sectional view showing one of the front side apparatus folded up in position against the top and out of the way when not in use.
Fig. 8 is a sectional view from the line 8—8 of Fig. 7 showing some of the parts and portions fragmentarily.

Secured to the upper portion of the wind shield at the center is a spring clip 19 see Fig. 8 which is adapted to receive the extended end of the bar 9 when it is shifted to a horizontal position as shown best in Figs. 5, 7 and 8 of the drawings. Also secured on the top in the proper position are spring latches 20 which are adapted to receive and support the free sides of the members 1, 2 and 3 or any combination of the panel members when folded up in a position out of the way as shown best in Figs. 7 of the drawings.

It will be noted that the panel members 2 and 3 or 5 and 6 may be shifted to a position so that the panels are horizontal instead of vertical as shown best in Fig. 5 of the drawing and serve as an inclosure for the side and when the panel members are folded together as shown best in Fig. 7 of the drawing, they are supported up out of the way as shown in said Fig. 7.

Figure 11:
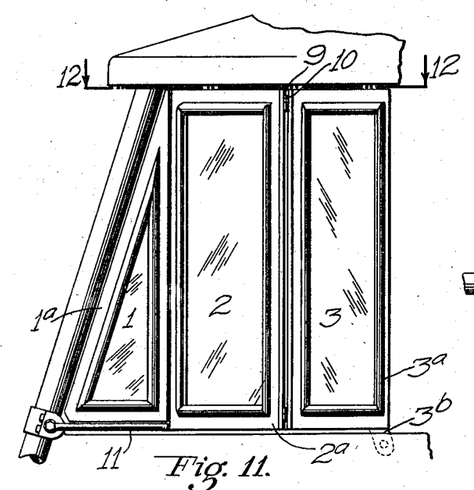
Fig. 11 is a side elevational view of a fragmentary portion of the side at the front of the vehicle showing the panel sections positioned for a wind deflector in partially folded form.
Figure 12:
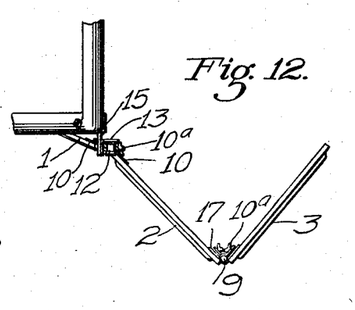
Fig. 12 is a top view of the same from the line 12—12 of Fig. 11.
Figure 16:
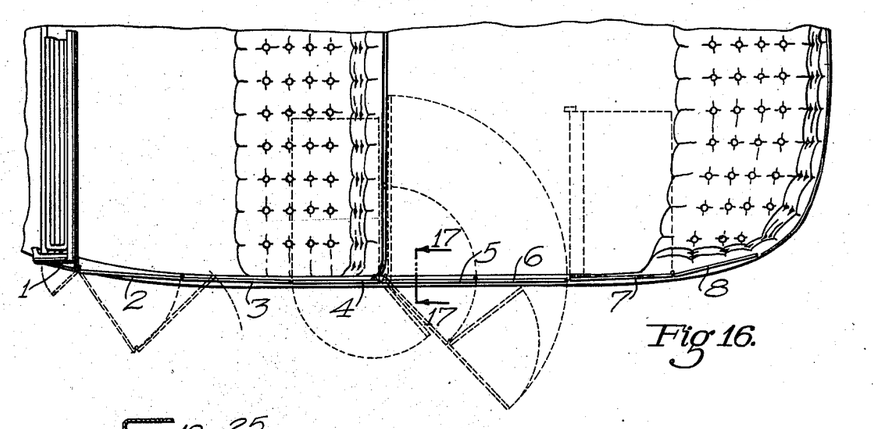
Fig. 16 is a plan view of a fragmentary portion of a vehicle body with the top removed showing by solid and dotted lines the varying positions of the apparatus when used as inclosures, wind shields, wind deflectors and up out of the way when not in use.
Figure 20:
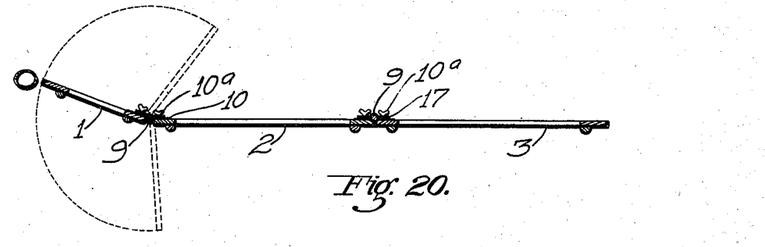
Fig. 20 is a sectional view through 20—20 of Fig. 2 showing varying positions of the panel section 1 by dotted lines.

It will also be noted that the panel member 1 may be shifted outwardly or inwardly on any angle on the supporting bar 9 as shown by dotted lines in Fig. 20 of the drawing to provide for an inclosure, air vent or deflector and that the panel members 2 and 3 and 4, 5 and 6 may be supported on an angle relatively to each other as shown best in Figs. 11, 12 and 16 of the drawings for providing wind deflectors and air vents on the side and that the panel members 3 or 6 may be secured to the door by means of a flap 3ᵃ shown best in Fig. 11 and move outwardly and inwardly with the door when opening and closing the same.

Figure 3:
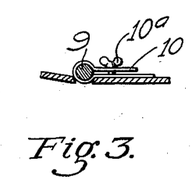
Fig. 3 is a sectional view through 3—3 of Fig. 2.
Figure 4:
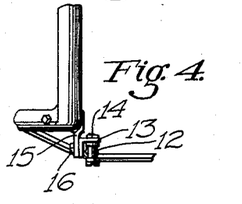
Fig. 4 is a view looking downwardly from the line 4—4 of Fig. 2.
Figure 13:
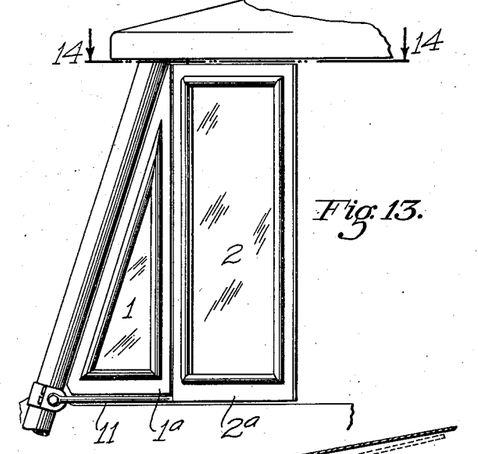
Figure 13 is a similar view to that of Fig. 11 showing a single panel in addition to the panel 1 instead of a plurality of panels.
Figure 14:
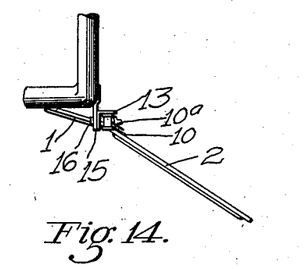
Fig. 14 is a top view of the same from a line 14—14 of Fig. 13.
Figure 15:
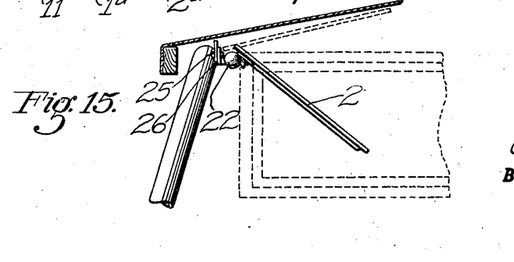
Fig. 15 is a detailed fragmentary sectional view of the front portion of the top and wind shield and showing the single panel by solid lines in a position as an anti-glare device and by dotted lines as a sun shade.

In case it is desired to use a single panel member, said panel member may be supported in the same manner as the panel member 2 and will serve as a wind deflector, as shown best in Figs. 13 and 14 of the drawings or may be shifted to positions as shown best in Fig. 15 of the drawing and serve as an anti-glare device for the occupants of the front seat and may be shifted to any position desired and is held in such position by frictional engagement of the hinge members 10 which are held in frictional engagement by the wing screw, shown best in Fig. 3 of the drawing, or this member 2 may be shifted so that it assumes a horizontal position as shown best by dotted lines in Fig. 15 of the drawing forming a sun shade on the side and this may be shifted to varying angles to suit, and supported by frictional engagement of the member 12 with the member 13.

Figure 17:
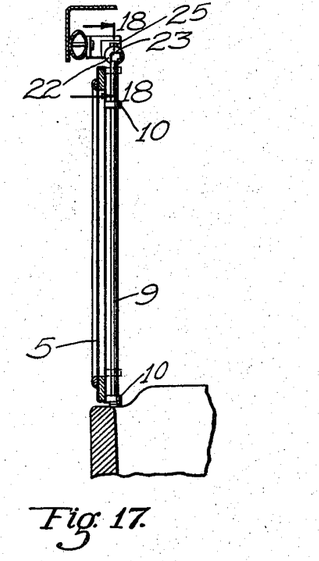
Fig. 17 is a sectional view on an enlarged scale through 17—17 of Fig. 16 showing the support for the bar 9 in a modified form.
Figures 21, 22:
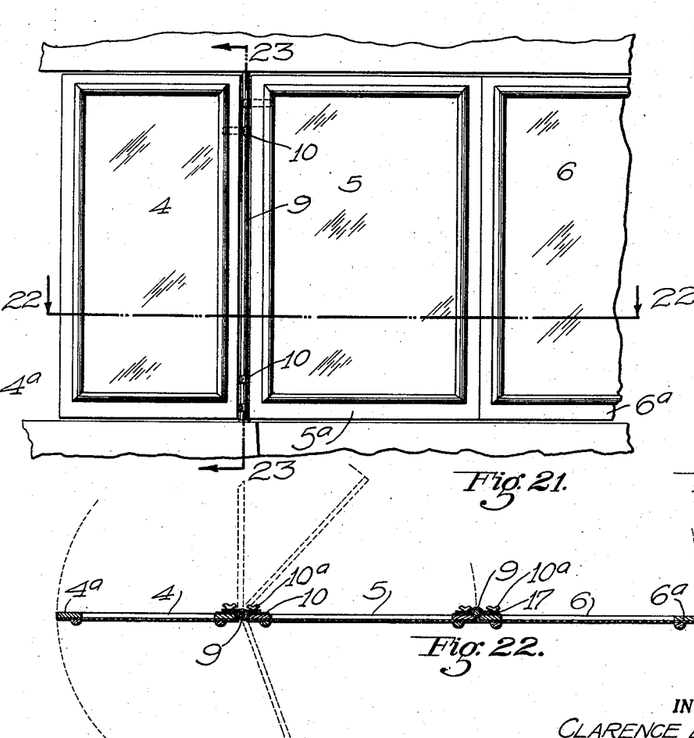
Fig. 21 is a side elevational view showing the panel members 4, 5 and 6 supported in relative relation to each other in a modified form from the other views of the drawings.
Fig. 22 is a sectional view through 22—22 of Fig. 21
Figure 23:
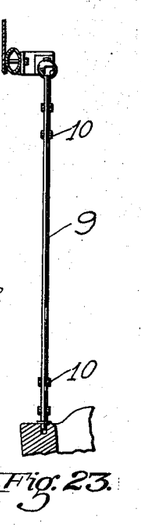
Fig. 23 is a sectional view through 23—23 of Fig. 21.

The tonneau or rear door extension inclosure consisting of the panel members 4, 5 and 6 are supported by the bar 9 and its supporting members 12, 13, 14, 15 and 16 in the same manner as the panel members 1, 2 and 3, the support 15 being secured to the vehicle top, preferably on one of the side bows of the vehicle top as shown best in Fig. 17 of the drawings or to a support secured to the top as desired. This Fig. 17, however, shows a modified form of support for the bar 9. The panel members 5 and 6 may be swung around in alignment with each other, forming a wind shield above the back of the front seat as shown by dotted lines in Fig. 16 of the drawings or may be shifted outwardly forming a side deflector for the tonneau portion of the vehicle as shown by dotted lines in said Fig. 16 or may be positioned in alignment with the side as shown by solid lines for providing an inclosure and extension for the rear door or the two members 2 and 3 may be positioned at an angle to each other as shown by dotted lines in Fig. 16 forming a wind deflector and partial vent. The member 4 is supported relatively to the member 5 in the same manner that the member 1 is supported relatively to the member 2 on the bar 9 as shown best in Fig. 21 of the drawing in which the member 4 may be shifted inwardly or outwardly on any angle as shown best in Fig. 22 of the drawing to provide for vent, inclosure or wind deflector, the member 4 serving as a wind deflector while the members 5 and 6 extend inwardly for a wind shield over the top of the back of the front seat.

The panel member 4, however, may be pivoted upon a separate bar 9 and its supports mounted on the top bow of the vehicle or other support so that the panel member 4 may be shifted independently of the members 5 and 6 to a position in the top of the vehicle in the same manner as the members 2 and 3 as shown best in Figs. 7 of the drawings, the panel members 7 and 8 may be similarly supported and adapted to swing up against the top out of the way when not in use as an inclosure, as shown best by dotted lines in Fig. 16, they being folded together in the same manner that the members 2 and 3 and 5 and 6 fold together.

Figure 18:
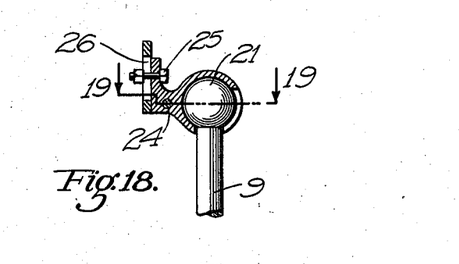
Fig. 18 is a sectional view on a larger scale through 18—18 of Fig. 17.
Figure 19:
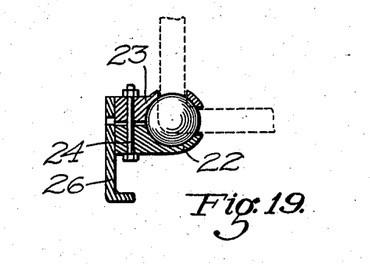
Fig. 19 is a sectional view through 19—19 of Fig. 18.

In the modified form of construction of support for the bar 9 shown in Figs. 17, 18 and 19 of the drawings the bar 9 is provided on its upper end with a spherical member 21 over which is mounted a pair of semi-spherical hollow members 22 and 23 which are secured together by means of a bolt 24 which provides the proper frictional contact between the members 21, 22 and 23, the member 22 is provided with a bolt 25 which is shiftably mounted in a slot 26 which is secured to the vehicle body similarly to the support 15 and provides for shifting the supporting bar 9 upwardly and downwardly by frictional engagement between the members 23, 22 and 26, adjusted by the bolt 25. The members 23 and 22 are provided with a T shaped slot therein when said members are secured together permitting the shifting of the member 9 to the various radial positions as hereinbefore described.

Though I have shown and described a particular construction of apparatus and certain combinations and arrangements thereof and certain modifications thereof I do not wish to be limited to this particular construction, combination and arrangement nor to the modifications as disclosed but desire to include in the purview of my invention the construction, combination and arrangement substantially as set forth in the appended claims.

It is obvious that with this construction there is provided apparatus for inclosing the sides of a vehicle which may be readily converted into wind deflectors, ventilators, sun shades and anti-glare devices and which may be readily positioned up out of the way against the top inside of the vehicle when not in use, that one or a plurality of sections may be pivotally mounted together and turned so that their axes is in a vertical position or a horizontal position or turned backwardly and upon any angle from the vertical to the horizontal as desired and supported by frictional supports in any position between the vertical and the horizontal or radially from the support, that when the sections are in plurality they may be folded upon each other as desired or folded and supported at varying angles to each other and that the panel sections may be changed from vertical position to horizontal or from horizontal to vertical as desired and that the panel sections may be covered with transparent, translucent or opaque panels or any of them with either as desired for the comfort and convenience of the occupants of the vehicle.

Having thus described my invention what I claim as new and desire to secure by Letters Patent is:

1. A vehicle top side inclosure, including a long extended supporting bar, a multiple shiftable axis means connected to one end of said supporting bar and to a vehicle top above the driver's head for permitting its radial movement in any direction except forwardly, frictional means for supporting it in any of its various positions, a panel member pivotally mounted on said supporting bar, a plurality of panel members hinged together and one of them hinged to said panel member, and socket means secured to the vehicle adapted to receive the free end of said bar for supporting the lower end of said bar when said bar is in a vertical position.

2. A vehicle top side inclosure, including a long extended supporting bar, a multiple shiftable axis means connected to one end of said supporting bar and to a vehicle top above the driver's head for permitting its radial movement in any direction except forwardly, frictional means for supporting it in any of its various positions, a panel member pivotally mounted on said supporting bar, a plurality of panel members hinged together and one of them hinged to said panel member, and socket means secured to the vehicle adapted to receive the free end of said bar for supporting the lower end of said bar when said bar is in a vertical position, and separate means secured to the vehicle, adapted to be engaged by said bar for supporting it in a horizontal position.

3. A vehicle top side inclosure, including a long extended supporting bar, a multiple shiftable axis means connected to one end of said supporting bar and to a vehicle top above the driver's head for permitting its radial movement in any direction except forwardly, frictional means for supporting it in any of its various positions, a panel member pivotally mounted on said supporting bar, a socket member secured to the vehicle adapted to receive the free end of said bar for supporting the lower end of said bar when said bar is in a vertical position.

4. A vehicle top side inclosure, including a long extended supporting bar, a multiple shiftable axis means connected to one end of said supporting bar and to a vehicle top above the driver's head for permitting its radial movement in any direction except forwardly, frictional means for supporting it in any of its various positions, a panel member pivotally mounted on said supporting bar, a socket member secured to the vehicle adapted to receive the free end of said bar for supporting the lower end of said bar when said bar is in a vertical position, and separate means secured to the vehicle adapted to be engaged by said bar for supporting it in a horizontal position.

5. A vehicle top side inclosure, including a multiple axis supporting means, a panel member secured to a portion of said multiple axis supporting means at only one of the normally upper corners of said panel member, a socket means secured to the vehicle adapted to reecive the free end of said panel member for supporting the lower end when said panel member is in a vertical position.

6. A vehicle top side inclosure, including a multiple axis supporting means, a panel member secured to a portion of said multiple axis supporting means at only one of the normally upper corners of said panel member, socket means secured to the vehicle adapted to receive the free end of said panel member for supporting the lower end when said panel member is in a vertical position, and separate means secured to the vehicle adapted to be engaged by said free end of said panel member for supporting it in a horizontal position.

7. A vehicle top side inclosure, including a multiple axis means secured to a vehicle top above the driver's head, a panel member secured to said multiple axis means at only one of the normally upper corners thereof, another panel member hinged to the free side of said panel member, and means secured to the vehicle adapted to receive the free end of said panel member for supporting the lower end of said panel member when the said panel member is in a vertical position.

8. A vehicle top side inclosure, including a multiple axis means secured to a vehicle top above the driver's head, a panel member secured to said multiple axis means at only one of the normally upper corners thereof, another panel member hinged to the free side of said panel member, a means secured to the vehicle adapted to receive the free end of said panel member for supporting the lower end of said panel member when said panel member is in a vertical position, and separate means secured to the vehicle adapted to be engaged by the free end of said panel member for supporting it in a horizontal position.

9. A vehicle top side inclosure, including a bar, multiple axis means secured to the normally upper end of said bar above the driver's head, a panel member with one side pivotally mounted on said bar between said multiple axis means and its opposite end.

10. A vehicle top side inclosure, including a bar, multiple axis means secured to the normally upper end of said bar above the driver's head, a panel member with one side pivotally mounted on said bar between said multiple axis means and its opposite end, and another panel member pivotally connected to the free side of said panel member.

11. A vehicle top side inclosure, including a bar, multiple axis means secured to one end of said bar, a panel member with one side pivotally mounted on said bar between said multiple axis means and its opposite end, and means connected to the top adapted to be engaged by the free end of said bar for supporting said bar in a vertical position or in a horizontal position.

12. A vehicle top side inclosure, including a bar, multiple axis means secured to one end of said bar, a panel member with one side pivotally mounted on said bar between said multiple axis means and its opposite end, another panel member pivotally connected to the free side of said panel member, and means connected to the top adapted to be engaged by the free end of said bar for supporting said bar in a vertical position or in a horizontal position.

13. A vehicle top side inclosure, including a multiple frictionally shiftable axis means secured to a vehicle top above the driver's head, and a panel member secured to said multiple axis means at only one of the normally upper corners thereof.

14. A vehicle top side inclosure, including a multiple frictionally shiftable axis means secured to a vehicle top above the driver's head, and a panel member secured to said multiple axis means at only one of the normally upper corners thereof, and another panel member pivotally and frictionally secured to the free side of said panel member.

15. A vehicle top side inclosure, including a multiple frictionally shiftable axis means secured to a vehicle top above the driver's head, a panel member secured to said multiple axis means at only one of the normally upper corners thereof, and means secured to the vehicle adapted to engage the free end of said panel member when in a vertical position for supporting the same.

16. A vehicle top side inclosure, including a multiple frictionally shiftable axis means secured to a vehicle top above the driver's head, a panel member secured to said multiple axis means at only one of the normally upper corners thereof, and means secured to the vehicle adapted to engage the free end of said panel member when in a horizontal position for supporting the same.

17. A vehicle top side inclosure, including a long extended supporting bar, a multiple shiftable axis means connected to one end of said supporting bar and the vehicle top for permitting its radial movement in any direction except forwardly, a panel member pivotally mounted on said supporting bar, another panel member pivotally mounted on said supporting bar separately movable relatively thereto.

18. A vehicle top side inclosure, including a long extended supporting bar, a multiple shiftable axis means connected to one end of said supporting bar and the vehicle top for permitting its radial movement in any direction except forwardly, a panel member pivotally mounted on said supporting bar, another panel member pivotally mounted on said supporting bar separately movable relatively thereto, and means secured to the vehicle adapted to receive the free end of said bar for supporting the lower end of said bar when said bar is in a vertical position.

19. A vehicle top side inclosure, including a long extended supporting bar, a multiple shiftable axis means connected to one end of said supporting bar and the vehicle top for permitting its radial movement in any direction except forwardly, a panel member pivotally mounted on said supporting bar, another panel member pivotally mounted on said supporting bar separately movable relatively thereto, and means secured to the vehicle adapted to receive the free end of said bar for supporting the lower end of said bar when said bar is in a vertical position, and separate means secured to the vehicle top adapted to be engaged by said bar for supporting it in a horizontal position.

20. A vehicle top side inclosure, including a long extended supporting bar, a multiple shiftable axis means connected to one end of said supporting bar and the vehicle top for permitting its radial movement in any direction except forwardly, a panel member pivotally mounted on said supporting bar, another panel member pivotally mounted on said supporting bar separately movable relatively thereto, means secured to the vehicle adapted to receive the free end of said bar for supporting the lower end of said bar when said bar is in a vertical position, and separate means secured to the vehicle top adapted to be engaged by said bar for supporting it in a horizontal position, and another panel member pivotally connected to the free side of one of said panel members.

21. A vehicle top side inclosure comprising a supporting bar, multiple axis means including a member arranged for attachment to a vehicle top and also a member for attachment to one end of said bar, said multiple axis means enabling said bar to be arranged in either a vertical or a horizontal position, and a panel member pivotally mounted on said bar.

22. A vehicle top side inclosure comprising a supporting bar, multiple axis means including a member arranged for attachment to a vehicle top and also a member for attachment to one end of said bar, said multiple axis means enabling said bar to be arranged in either a vertical or a horizontal position, and a plurality of panel members hingedly connected together and one of which is pivotally mounted on said bar.

In testimony whereof, I have hereunto set my hand at San Diego, California, this 8th day of January, 1920.

CLARENCE E. CHILDS.